I. REYNOLDS.
Plow-Point.
No. 7,223. Patented Mar. 26, 1850.
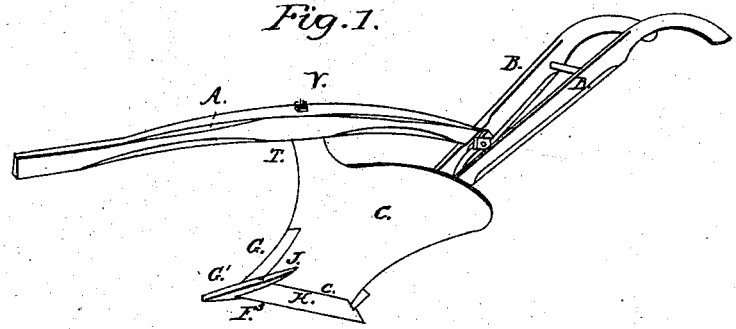
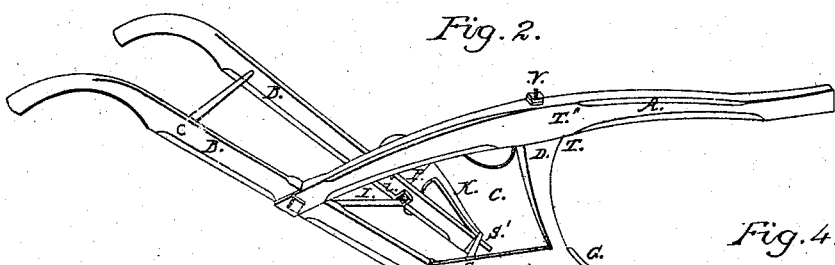
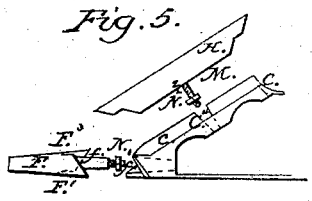
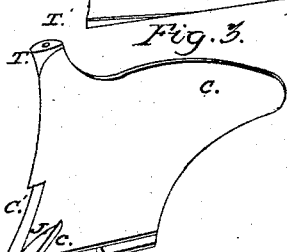
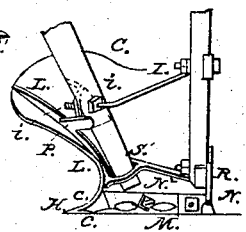
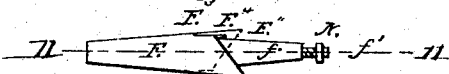
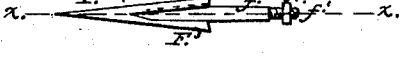
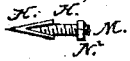
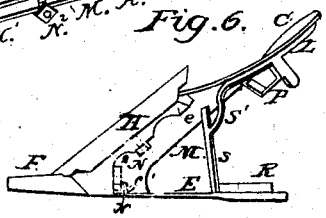

UNITED STATES PATENT OFFICE.

IRA REYNOLDS, OF WEST LIBERTY, OHIO.

IMPROVEMENT IN PLOWS AND CLEVISES.

Specification forming part of Letters Patent No. 7,223, dated March 26, 1850.

*To all whom it may concern:*

Be it known that I, IRA REYNOLDS, of West Liberty, in the county of Logan and State of Ohio, have invented a new and useful Improvement in Plow, which is described as follows, reference being had to the annexed drawings of the same, making part of this specification.

Figure 1 represents a perspective view of the furrow side of the plow. Fig. 2 is a perspective view of the land side of the same. Fig. 3 is a perspective view of the furrow side of the mold-board, the point, share, cutter, &c., being detached therefrom. Fig. 4 is a sectional elevation of the rear portion of the plow. Fig. 5 is a sectional view of the mold-board inverted, the point of share being represented as separated therefrom. Fig. 6 is a view of the plow inverted, the share and point being in their proper places. Fig. 7 is a perspective view of the reversible point. Fig. 8 is a perspective view of the reversible share. Fig. 9 is a perspective view of the cutter. Fig. 10 is a perspective view of the share in another position, showing the recess or V-shaped groove therein to receive the lower portion of the mold-board. Fig. 11 is a geometrical view or plan of the point. Fig. 12 is a view of the side of the same. Fig. 13 is a cross-section of the reversible share.

Where the before-mentioned figures have the same letters of reference on them they refer to like parts.

The beam A and handles B B, mold-board C, sheth D, and landside E, being partially similar to others in use, will not require to be particularly described, as I intend to make no particular claim to these parts.

The reversible point F and share H being the parts of the plow that I have essentially improved, I shall therefore confine my description mostly to those parts. I shall, however, point out certain improvements in the manner of employing an adjustive screw-rod, I, for bracing the beam and handles, and also for changing the position of the beam while so bracing it, so as to cause the plow to take more or less land, thus dispensing with the necessity of changing the clevis, likewise, in the formation of a protuberance, J, or swell on the lower and front portion of the mold-board and several improvements relating to the head of the sheth and certain stiffners, K L, and peculiarly-shaped box-plate P, formed on the inside of the mold-board, which, together with the landside, are cast in one piece.

The reversible point F, as well as the cutter and share, is made of the best cast-steel. The former is made of a wedge shape about one-half its length, the taper commencing where two oblique triangular shoulders, F' F'', are formed. A portion of its length, which constitutes the stem $f$, is reduced in its size, and tapered on its sides, where it passes through the mold-board and fitted into a corresponding aperture cast in the lower front portion of the mold-board. The rear end, $f'$, is made round, and has a screw cut on it for a nut, N, which is screwed against the inner side of the front part of the mold-board, as seen in Figs. 4 and 6, in the manner and for the purpose hereinafter described. The oblique lines of the triangular shoulders or wings cross each other in the manner represented in Fig. 11, one of said shoulders being on one side of a horizontal plane represented by the dotted line $x\ x$, passing through the center of the reversible point, and the other on the opposite side, as shown in Fig. 12, and the point of one shoulder being on one side of a vertical plane represented by the dotted line 11 11, passing through the center of the point, and the other on the opposite side, as shown in Fig. 11. These shoulders are sloped or beveled inwardly at an angle of about forty-five degrees with the horizontal plane aforesaid, forming beveled grooves or channels, one for each shoulder, which fit over a corresponding portion of the front of the mold-board, said reversible point having curved grooves or recesses $F^3$ in the outer sides of the reversible point to receive the front portion of the cutter and the forward point of the share, so that when the aforesaid nut is screwed against the inside of the front part of the mold-board to draw the reversible point toward it the triangular shoulders shall simultaneously and effectually draw together and bind all the parts of the plow connected therewith. During the operation of plowing the resistance of the earth against said point will cause it to bind the cutter and share still more firmly to the mold-board, and also to strengthen the front of the landside and mold-board where they unite.

The grooves $F^3$, for the insertion of the angular points of the share, extend from the rear points of the shoulders toward the front point about half its length. The grooves $F^4$, for the reception of the turned end $G'$ of the cutter, are made in the inner sides of the shoulders, and are slightly curved, so that when the point $G'$ is inserted therein and the nut N is turned the cutter G is forced back into its recess or bed $C'$, Fig. 3, from which it cannot escape until the motion of the nut N is reversed, the locking of the cutter with the mold-board being effected by making one side and end of the cutter beveling, and fitting the same into a recess of a corresponding shape. A notch is also made in each edge of the reversible point to admit the aforesaid point $G'$ of the share to enter the notch $F^4$ more freely.

The cutter G, as before stated, is made of steel in the form of a curved blade, with its front edge concave and sharp to cut the soil freely, and its rear edge and top made stout and beveling, as before mentioned, and fitted into a corresponding seat or recess, $C'$, in the front of the mold-board, as above stated. The lower end of the cutter is turned down at $G'$ in the form of a hook for hooking into the aforesaid curved groove $F^4$ in the reversible point, as heretofore stated. The reversible share H is likewise made of steel, of two thin plates having obtuse angled notches in their ends, said plates being welded together at their front or cutting edges and separated at their rear edges, leaving a triangular space between said plates for the insertion of the lower edge, $C^2$, of the mold, which is made of a triangular or V shape, or of a corresponding shape to said triangular space $H'$. Between these two plates is welded a male screw, M, projected back at right angles to the straight edges of the shares and passing through a mortise, $C^4$, in the lower part of the mold-board. When the share is put in its proper place a nut, $N^2$, is screwed upon said screw M, which turns against the inside of the mold-board, for drawing the share closely into its seat and firmly against the shoulders $c\ c$ on the mold-board. In Fig. 6 the manner of using this nut is clearly shown, also the manner of applying the nut of the shank of the reversible point. When the position of the share is required to be inverted the nut must be removed and the screw M withdrawn from its socket and again inserted when the position of the share is changed. The nuts, being above the level of the bottom of the plow and behind the thick portions of the mold-board, are entirely out of the way of the earth, and consequently will not become clogged. The straight and thick edges of the plates composing the share rest against the straight shoulders $c\ c$, (when drawn back by the nut aforesaid,) formed at the base of the triangular tongue on the lower edge of the mold-board, and which enter the V-shaped space in the back of the share.

The protuberance J, cast on the fore part of the mold-board, is to strengthen it, and to give a more firm bearing for the oblique shoulder of the reversible point when this is drawn firmly against it by the screw and nut. The bevel or slope on the face corresponding exactly with the bevel or slope of the shoulder, which rests against it and forms a continuation of the same.

On the inside or convex surface of the mold-board are cast a number of ribs or stiffners to strengthen the mold-board. Two of them are united by a box-plate, P, to which one of the handles is secured by an oblique screw-rod, I, extending from the rear end of the beam and the landside-handle, to which the beam is attached, obliquely downward through the opposite or mold-board handle, and through said box-plate P, where it is secured by two nuts, $i\ i$, in such a manner that by turning said screw-nuts said rods may be made to perform the double office of brace and regulator of the beam, the lower end of the beam-handle being inserted into a box, R, cast on the landside in such manner that the upper end of the handle may move a few degrees in the arc of a circle scribed from the said box R during the operation of adjusting the beam, while the lower end remains in the same position.

In adjusting the beam for causing the plow to take more or less land by said rod and nuts the handles and beam must necessarily move or bend simultaneously. The bearing-point on which the mold-board handle binds being the aforesaid box-plate P.

The brace S, with its curved branch $S'$, is cast with the landside and mold-board, and is for the purpose of receiving the handle next the mold-board and for strengthening the plow.

A curved shield, T, is cast on the front of the head of the sheth for the purpose of preventing the accumulation of weeds and other matters which might have a tendency to obstruct the due action of the plow.

V is the bolt passing through the head of the sheth and beam for confining the former to the latter.

The ribs K L, in connection with the cap P, strengthen the mold-board sufficiently to receive the brace-rod I and form a complete connection between the mold-board and beam, as described and designated.

Attaching the curved brace $S'$ to the under side of the landside and mold-board connection or brace S serves the double purpose of bracing said connection and forms an opening to receive the lower end of the mold-board handles, not intending to claim as new the cast mold-board and landside connection, but only the peculiar and useful manner of attaching a section of a semicircular brace thereto for the purpose above stated.

It should have been stated that the share may be rolled directly from a single plate of steel, forming a triangular groove, as above stated; or it may be folded and welded and properly shaped in any convenient way.

The curved cap T at the head of the sheth may be made to project about three-fourths of an inch from the beam on the landside of the plow, designed also to form a substantial shoulder or bearing for a cutter, being curved upon the land side and correspondingly projected upon the furrow side and front portion of the sheth, and is calculated to strengthen the same, and also to prevent the accumulation of weeds around the head of the sheth.

There may also be added to the heel of the landside (should it be deemed necessary on account of severe friction on that part in stony land) a renewable steel heel or lining, formed of suitable size steel, the rear end being beveled inward and upward, while the forward end is turned to a right angle about one-half its width, forming a tenon to fit a corresponding mortise cast through the landside, and while hot may be driven and bent backward, thus forming a hook at each end, and firmly fitted to its place by being tempered in said position.

Having described the nature of my invention and improvement, what I claim, and desire to secure by Letters Patent, is—

1. Making the reversible point F with the triangular shoulders F' F'', in combination with the screw $f'$ and nut N, for binding firmly together the landside E, mold-board C, cutter G, and share H, as well as securing itself, in the manner herein fully described.

2. The device for fastening the reversible share to the flange on the lower part of the mold-board, substantially as set forth.

3. The manner of employing the inclined brace-rod I, in combination with the box-plate P, cast on the inside of the mold-board, for adjusting the beam to take more or less land to act as a substitute for the clevis, and at the same time to brace or stiffen the wood-work of the plow by attaching it to the cast-iron mold-board and landside, as described.

In testimony whereof I have hereunto signed my name before two subscribing witnesses.

IRA REYNOLDS.

Witnesses:
WM. P. ELLIOT,
LUND WASHINGTON.